April 21, 1936. A. G. GRONDAHL 2,037,973
POWER GENERATOR
Filed Jan. 30, 1935 4 Sheets-Sheet 1
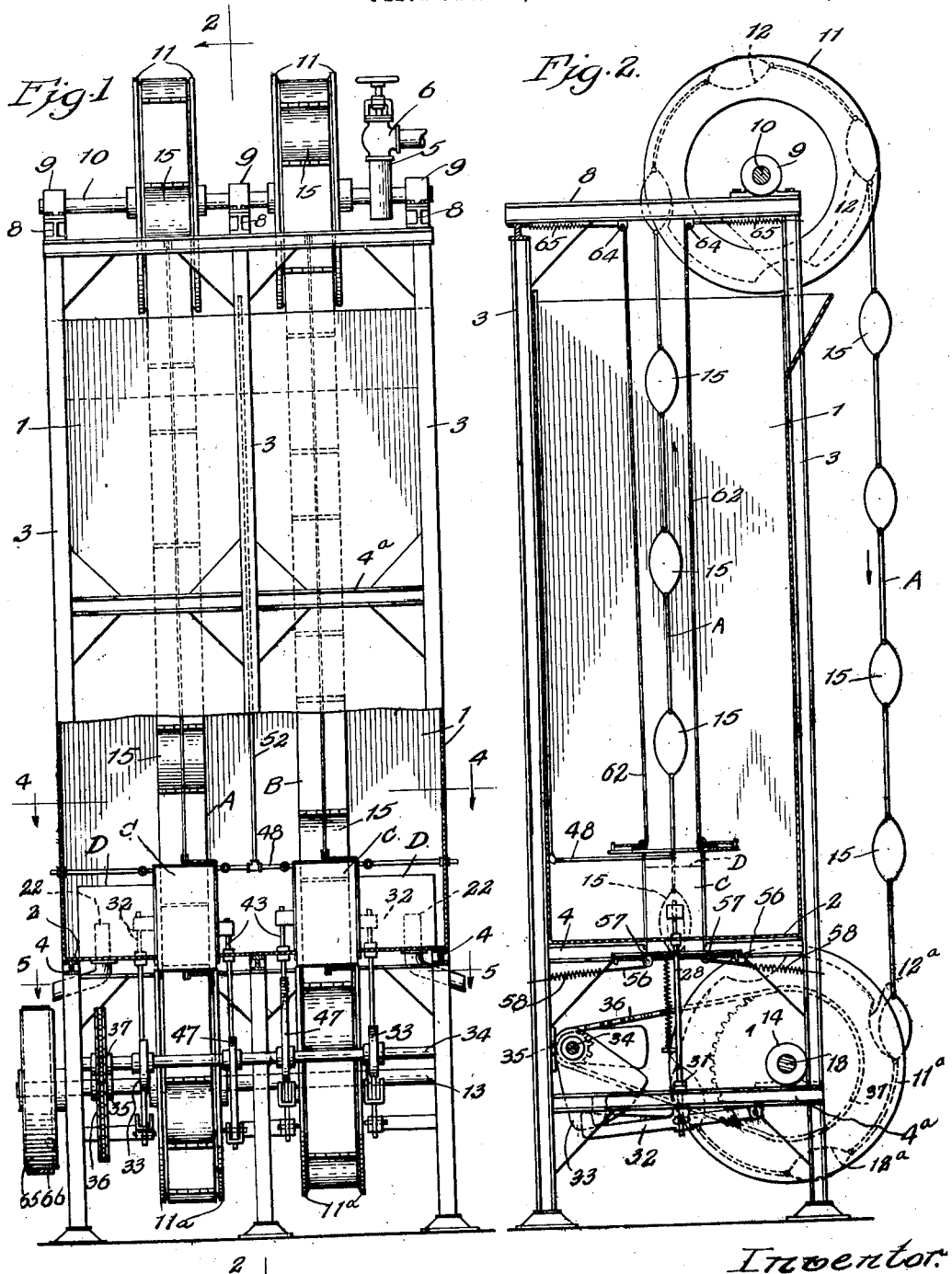
Inventor.
ALFRED G. GRONDAHL
By April 21, 1936.   A. G. GRONDAHL   2,037,973
POWER GENERATOR
Filed Jan. 30, 1935   4 Sheets-Sheet 2
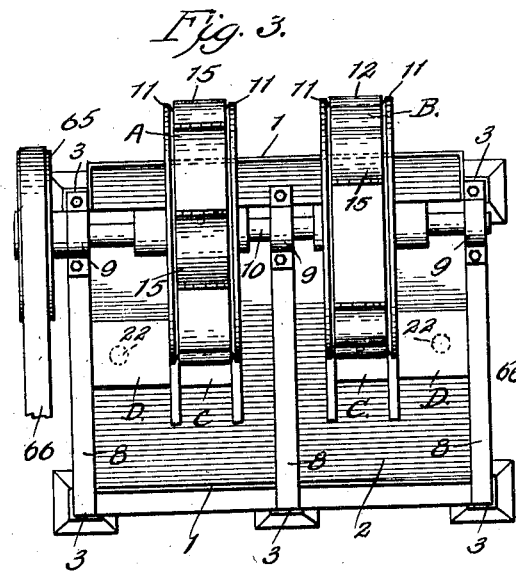
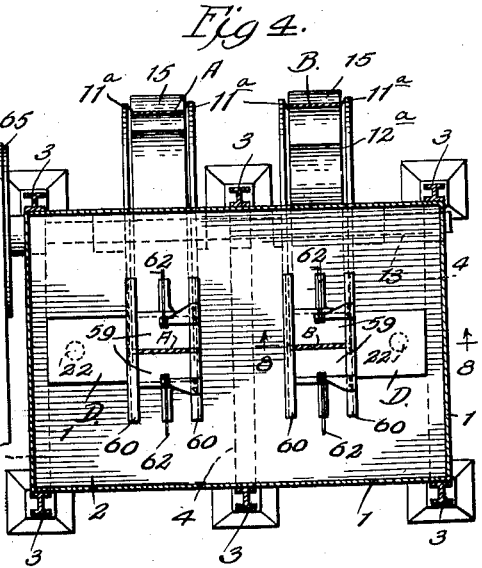
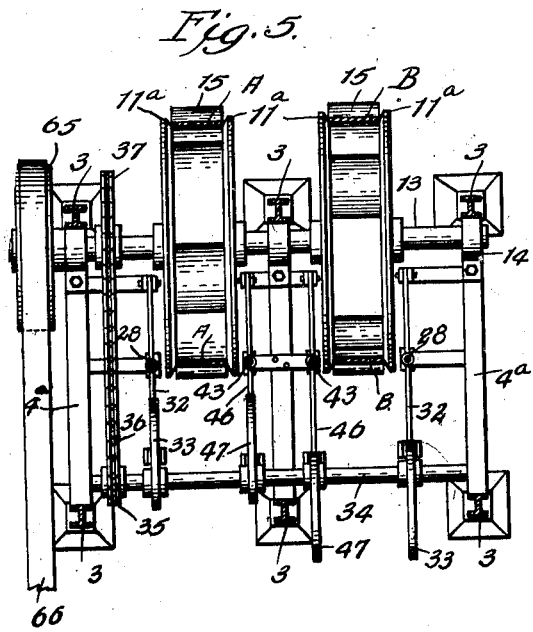
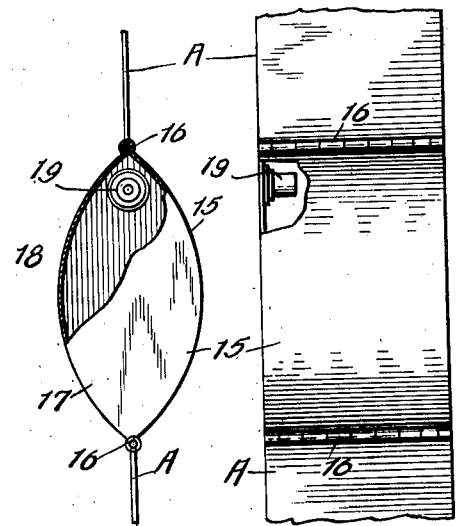
Inventor:
ALFRED G. GRONDAHL April 21, 1936. A. G. GRONDAHL 2,037,973
POWER GENERATOR
Filed Jan. 30, 1935 4 Sheets-Sheet 3
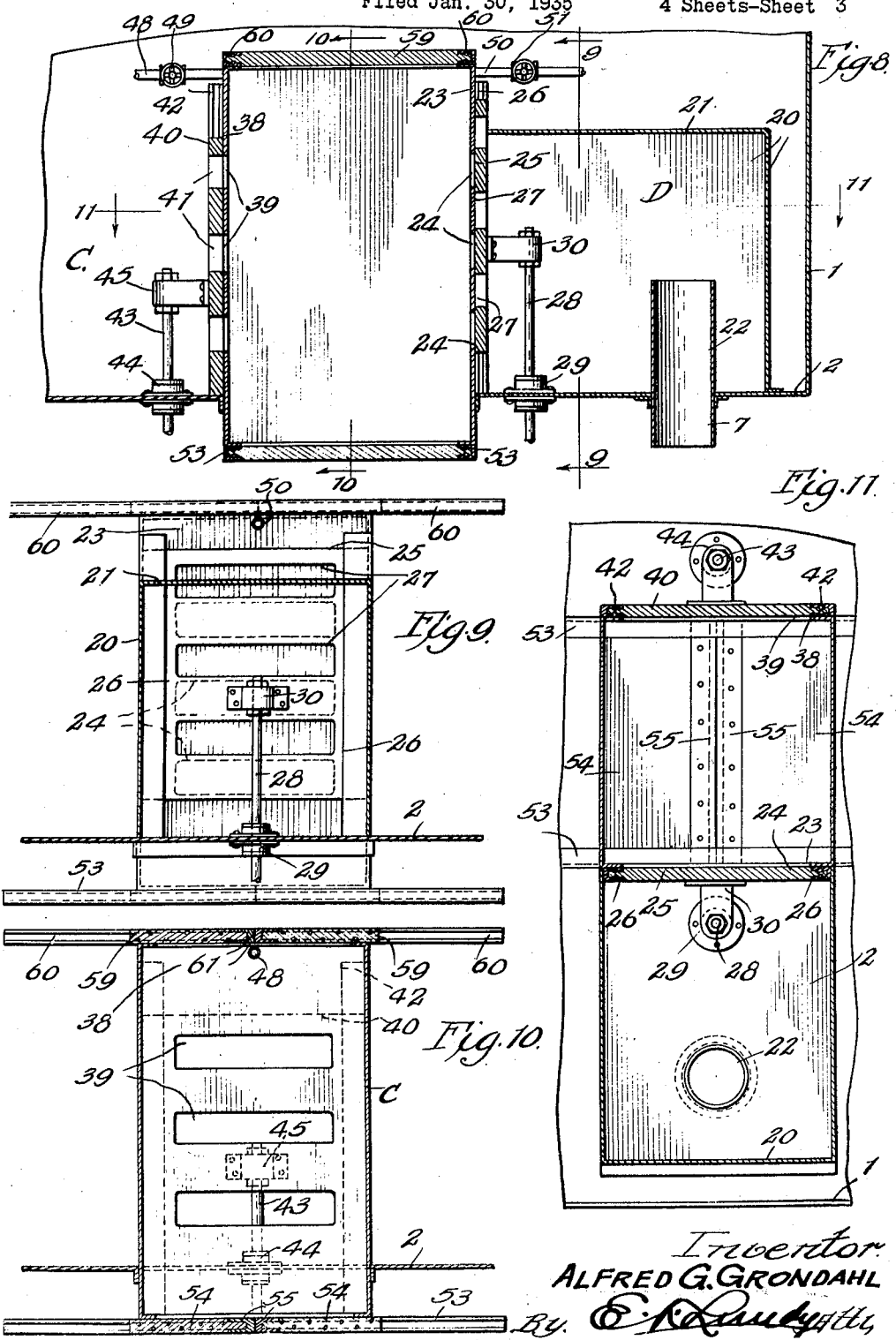

April 21, 1936.  A. G. GRONDAHL  2,037,973
POWER GENERATOR
Filed Jan. 30, 1935  4 Sheets-Sheet 4
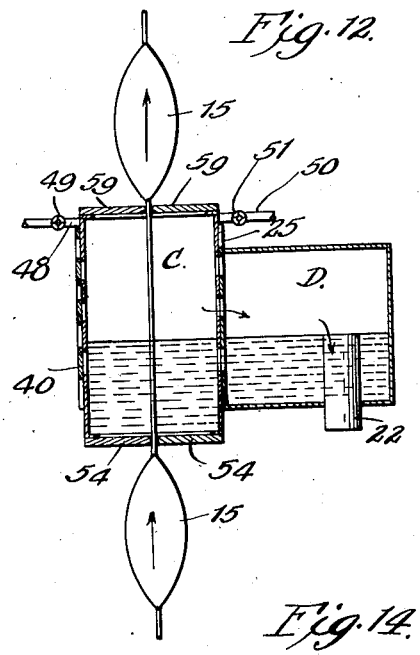
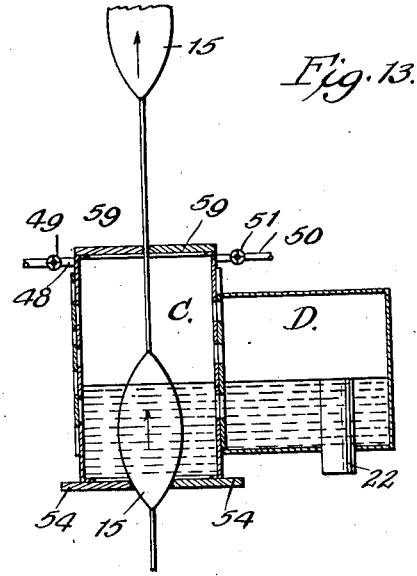
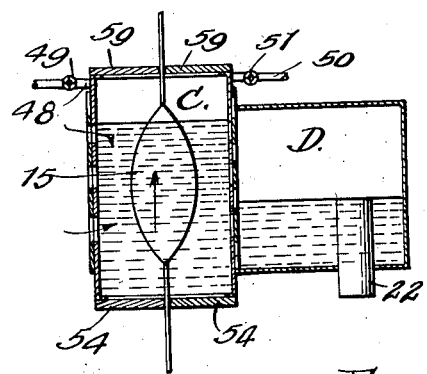
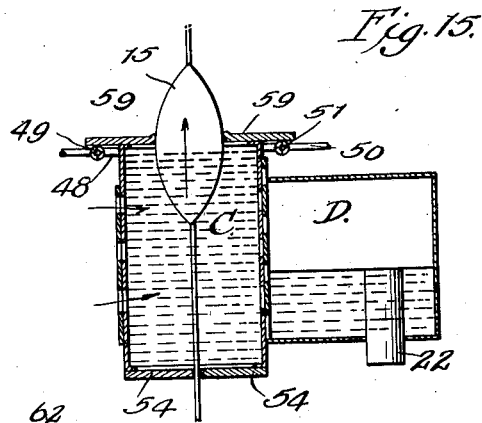
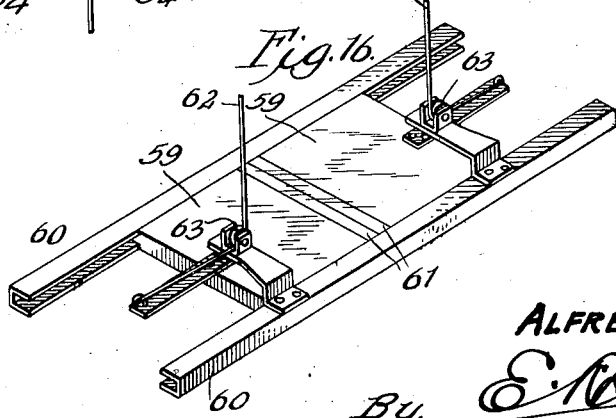
Inventor:
ALFRED G. GRONDAHL Patented Apr. 21, 1936

2,037,973

UNITED STATES PATENT OFFICE 2,037,973

POWER GENERATOR

Alfred G. Grondahl, Chicago, Ill.

Application January 30, 1935, Serial No. 4,115

6 Claims. (Cl. 60—22)

This invention is an improvement in power generators, and more particularly relates to that class known as hydro-power generators. The apparatus which is herein disclosed depends upon the buoyancy of a series of water-tight and air-tight compartments or floats that pass upwardly through a body of water to thereby rotate a wheel or pulley and create the power desired. Detailed structures are provided for relieving the floats of a considerable portion of the hydraulic pressure or weight of the fluid when the successive floats are entering the body of water. The generator is adapted for use as a unit at any location where a continuous supply of fluid is available, and also it is capable for use in a multiple installation where a battery of units are disposed alongside a water conduit or natural stream and several generator units may be connected to a common shaft that is actuated thereby.

Certain objects of the invention reside in the provision of a power generator that is novel in construction; that is comparatively simple in the arrangement or disposition of the parts; that is dependable in performing the functions for which it is designed; that is made of sturdy parts so that it is durable and will withstand hard usage; that is capable of generating considerable power at a comparatively low cost of operation; and that is simple in operation and requires comparatively little attention. Numerous other objects and advantages will be apparent to persons skilled in the art after the construction and operation is understood from the following disclosure of this invention.

It is preferred to accomplish the foresaid objects and to practice this invention in substantially the manner hereinafter fully described and as more particularly pointed out in the appended claims. In connection with the description, reference is made to the accompanying drawings that form a part of this specification, which drawings schematically illustrate a typical or preferred form in which the improved power generator may be constructed.

In the drawings:—

Fig. 1 is a vertical front elevation of the apparatus with lower portion of the front wall of the tank or water receptacle broken away to disclose the interior.

Fig. 2 is a vertical section of the operating parts, the view being taken on the plane of line 2—2 of Fig. 1.

Fig. 3 is a top plan.

Fig. 4 is a horizontal section on the plane of line 4—4 of Fig. 1.

Fig. 5 is a horizontal section on line 5—5 of Fig. 1.

Fig. 6 is a detail side view of one of the buoyant members or floats with a wall broken away.

Fig. 7 is a detail front view of a buoyant member.

Fig. 8 is a vertical section on line 8—8 of Fig. 4 and drawn to a larger scale.

Fig. 9 is a vertical section on line 9—9 of Fig. 8.

Fig. 10 is a vertical section on line 10—10 of Fig. 8.

Fig. 11 is a horizontal section on line 11—11 of Fig. 8.

Figs. 12, 13, 14 and 15 are sectional schematic views illustrating successive stages in the operation of the apparatus and showing different positions of a buoyant member through the pressure relieving chamber.

Fig. 16 is a detail in perspective of the mechanism for automatically controlling the entrance and exit of the buoyant members into and out of the pressure relieving chamber.

The tank or reservoir which contains a relatively deep body of water is shown as being of rectangular shape, but it will be understood such tank may be cylindrical or other shape if desired. The tank is open at its top and its vertical walls 1 and horizontal bottom wall 2 are made of metal plates of the required gauge that are welded together and may, if desired, be reinforced with encircling bands, hoops or otherwise. The tank is preferably supported above the floor or ground upon a suitably constructed frame consisting of uprights 3 that extend above the tank and horizontal sills 4 upon which the tank rests, and there are other cross-beams or braces 4ª, between sills 4 and the floor. Water is discharged into the tank from a suitable supply conduit 5 controlled by a valve 6, and such water as may be released or discharged from the tank during operation is conveyed therefrom by a spillway or waste-weir 7. The conduit 5 may be a pipe line leading from a river, or other body of water, and when the apparatus is employed in the form of a multiple of units a main conduit may be constructed from the water source and provided along its length with branches for supplying the individual units. With this apparatus it is not necessary to incur the expense of constructing a dam across a river or creek as all that is required is to convey the water by means of a suitable sluice away from the body of water to the conduit and its branches and to erect the generator unit or units in such position that the tank or tanks are below the conduit so that the water will flow into the same and be kept at the desired level at all times.

It will be obvious the arrangement just described is materially more economical and convenient to install, maintain and operate than where a dam must be built to impound a body of water and raise its level in order to provide the "drop" necessary for driving power generators.

At the top of the frame there are horizontal top-sills 8 above the tank upon which are provided bearings 9 for a horizontal shaft 10, and a pair of side-by-side pulleys are mounted upon shaft 10 so that they rotate therewith. These pulleys have side flanges 11 so as to provide a wide shallow channel, the bottom of which shallow channel is formed with arcuate concave pockets 12, preferably four in number disposed equidistance apart on each pulley, and the pulleys are arranged so that the pockets 12 of one pulley are alternated or staggered with respect to the pockets of the other pulley. It will be noted by reference to Fig. 2 that the shaft 10 and its bearings 9 are positioned toward the rear of the frame work and below said shaft.

Mounted upon the lower brace beam 4ª in vertical alinement with the shaft 10 is a second shaft 13 mounted in bearings 14 on the upper flanges of the brace beams 4ª. This lower shaft has a pair of side-by-side pulleys mounted on it that preferably rotate with it and said pulleys are constructed similar to the upper pulleys with side flanges 11ª that provide the shallow wide channel and the arcuate concave pockets 12ª in the same manner as the upper pulleys are constructed.

Endless belts A and B pass around the respective upper and lower pulleys and each belt has a plurality of buoyant members or floats 15 interposed in their length and spaced apart the distances between the centers of the pockets 12 and 12ª of the pulleys.

The buoyant members 15 are of elliptical shape in vertical cross section as shown in detail in Fig. 6 and they have hinged knuckles 16 at their upper and lower ends so that they have movable connection or articulation with the belts A and B. The side walls 17 of the buoyant members are plain flat plates of metal while the front and rear walls 18 bulge from their upper apex to their lower apex in a curve corresponding with the arcuate concave seats 12 and 12ª in the pulleys. The buoyant members are provided with outward pressure valves 19, preferably in their side walls 17 so that if desired, a lighter-than-air gas may be forced or pumped into the interiors of the buoyant members to render them more buoyant.

The disposition of the upper and lower pulleys is such that the upwardly moving reaches of the belts A and B will be disposed in the central portion of the tank while the downwardly moving reaches of these belts will be disposed outside the tank, as shown in Fig. 2. The spacing of the buoyant members 15 on the respective belts permits a plurality of said members to be disposed within the tank and passing through it at all times and the operation of the apparatus depends largely upon the buoyancy of these members or floats within the tank to move the immersed portions or reaches of the belts in an upward direction, thus rotating the respective upper and lower pulleys and their respective shafts 10 and 13.

For the purpose of permitting the successive buoyant members or floats to enter the tank and become influenced by the pressure of the column of water, suitable compartments are provided in or at the bottom of the tank into which said members pass prior to entering the tank, and said compartments are controlled by sliding valve plates and automatically returnable entrance and exit gates the operation of which relieves the compartment of the pressure of the column of water during entry of a member and then restores the pressure to permit the member to move out and up through the tank.

For the sake of simplicity and brevity one of these compartments will be described and this will be done by reference to Figs. 8 to 11 inclusive.

In Fig. 8 these are shown in vertical section of the entire compartment which is divided into two chambers C and D that are generally of rectangular shape and formed with metal plates. The chamber D is what may be termed for convenience the outlet or discharge chamber and comprises three vertical side walls 20, and a top wall 21, the vertical walls being secured to and arising from the bottom wall 2 of the tank, and the front and rear walls have their vertical edges connected to the adjacent wall and chamber C. There is a discharge tube or pipe 22 extended through the bottom of chamber D that leads to the spillway or waste-weir 7, and said discharge pipe 22 extends up into the chamber D approximately one-half more or less of the height of said chamber to determine the height of the body of water in said chamber.

The chamber C has its lower portion disposed preferably below the bottom of the tank and its vertical wall 23 next to chamber D is provided with several horizontally elongated slots or openings 24 that permit communication between the respective chambers. The openings 24 are controlled by a suitable sliding valve plate 25 that reciprocates vertically in suitable guides 26 adjacent the vertical edges of the wall 23 that may, if desired, be provided with ball or roller-bearings (not shown) to permit easy reciprocation of the movable element, and said valve plate 25 is provided with several horizontally elongated slots or openings 27 that correspond in shape and size with the openings 24 in the chamber wall, there being sufficient spaces between adjacent edges of the openings to permit closure of the chamber wall opening as shown in Fig. 8. It will be understood that valve plate 25 fits snugly against the chamber wall to prevent as much leakage as possible and yet permit of the desired movement of said valve plate.

A vertically reciprocable operating rod 28 passes through a stuffing box 29 (that also acts as a bearing) in the bottom of chamber D and has its upper portion secured to a boss 30 on the center of the valve plate, while the lower portion of said rod passes through a bearing 31 on the lower cross beam 4ª and has its end hingedly and adjustably connected to an intermediate portion of a lever 32 by which said rod is reciprocated.

The lever 32 is fulcrumed at one end on a convenient portion of the cross beam 4ª and its other end engages the irregular periphery of an edge cam 33 that is secured upon and rotates with an elongated cam-shaft 34 journaled in bearings on the adjacent front uprights or columns 3.

The timing of the cam-shaft 34 is done through the medium of a small sprocket 35 secured to an end portion of said shaft, that is driven by a chain 36 deriving its motion from a large sprocket 37 secured to the lower pulley shaft 13.

The dimensions of the sprockets 35 and 37 are of a ratio of four-to-one so that the smaller sprocket 35 makes four revolutions to one revolution of the large sprocket 37;—in other words, the small sprocket makes a revolution for each buoyant member 15 passing around its lower pulley, which permits the cam 33 to operate the slide plate for each buoyant member that enters the pressure relieving chamber C. The cam 33 is shaped so that there is a quick reciprocation of the slide valve plate 25 whenever the latter is moved.

The vertical wall 38 opposite the one just described is provided with several horizontally elongated slots or openings 39 that are controlled by a sliding valve plate 40 having several horizontally elongated slots or openings 41 corresponding in number, size, and shape with the wall openings 39. Said valve plate is moved up and down in guides 42 by a vertically reciprocable rod 43 that passes through a stuffing box bearing 44 at the bottom wall of the tank and has its upper end connected to a boss 45 on the valve plate 40, while the lower end of this rod is pivotally connected to a second-class lever 46 that engages at its power end with an edge cam 47 secured to cam-shaft 34.

The cam 47 is somewhat similar in shape to cam 33 and it is positioned upon the shaft 34 with its major axis at an angle to the major axis of the other cam 33 in order that the valve plates will be operated in substantially the manner suggested in Fig. 8 and in the diagrams embodied in Figs. 12 to 15 inclusive.

In the upper portion of the relief chamber C there is an air inlet pipe 48 controlled by a check valve 49 which permits air to enter the chamber through this pipe and prevents flow in the opposite direction. Another pipe 50 communicating with the upper portion of the chamber C is controlled by a check valve 51 that permits discharge of air from the chamber and prevents flow in the opposite direction. It wil be understood both pipes 48 and 50 extend outside the tank and for convenience the pipes 48 from the two relief chambers C meet at a T-coupling and a vertical pipe 52 extends upwardly to a plane above the water-level or outside the tank.

Check valve 51 is of the adjustable type and it is adapted to hold back the discharge of air from the relief chamber C until the air within said chamber is under suitable pressure that is automatically created during the entry of a buoyant member into the relief chamber as will be later fully described.

The buoyant members 15 on the belt enter and leave the chamber C through suitable slide gates that are opened by engagement with the leading ends of the buoyant members as they pass said gates and said gates provide closures for the top and bottom of the chamber C.

Extending along opposite edges of the bottom of the chamber are parallel U-shaped angle metal strips 53 disposed with their channels facing each other to form guides for the gates and are provided with suitable anti-friction elements such as ball or roller-bearings. Two edge alining gates 54 are mounted for horizontal reciprocable movement towards and from each other in said guides, and the contiguous edges of these gates are provided with overhanging rubber flaps 55 as shown in Figs. 10 and 11. These gates are urged towards each other by means of flexible cables 56 that have their intermediate portions passed around pulleys 57 mounted on the tank supporting frame, and one end of each cable is secured to the outer edge of the respective gate 54 while the other end of each cable is adjustably secured to a contraction spring 58 that has connection with an upright or column 3 of the frame.

Belt A is disposed between the edges of the gates and moves upward with the rubber flaps 55 in contact with its opposite surfaces until the leading edge of a buoyant member reaches the flaps, and the springs hold said flaps snugly against the belt to prevent discharge of water. When the buoyant member engages the flaps it begins to enter the chamber by pushing the gates 55 apart against the action of the springs until the widest portion of the bulge of the member passes the gates and these after the gates begin movement towards each other. At all times during this entrance of the buoyant member the flexible flaps are snugly engaged with the opposite curved surfaces of the member.

At the top of the chamber C there is another pair of gates 59 that operate in U-shaped angle metal guides 60 and have overhanging flexible flaps 61, all constructed and arranged in the same manner as at the bottom of the chamber. These gates are urged towards each other by means of flexible cables 62 that have their adjacent portions passed around pulleys 63 and connected to the outer edges of the gates, while the main portions of the cables extend up out of the tank and over pulleys 64 on the upper horizontal cross sill 8 and have their ends adjustably connected to contraction springs 65 that are secured to a convenient portion of the frame. These upper gates close the top of chamber C and operate and function in the same manner as the lower gates 54 that close the bottom of said chamber.

The foregoing description has been given in connection with one of the pressure relieving chambers and its associated discharge or spill chamber, and it will be understood that the same description applies to the respective chambers of the other compartments shown in the drawings wherein the parts are duplicated and bear the same reference characters. The slide plate valves and gates on one compartment operate in alternation with the corresponding parts on the other compartment on account of the staggered relation of the buoyant members or floats on the belts A and B. It will also be appreciated that the apparatus may be operated with a single belt and allied parts or more than two sets of these parts may be employed depending upon the service required of the generator.

One end of a pulley shaft, preferably shaft 13, is extended beyond its bearings where it has a drive or power wheel 65 secured to it that has operative connection, as by a drive belt 66, with a suitable mechanical movement from which power or motion may be derived for whatever use desired.

Figures 12 to 15 show in diagrammatic form several stages and relative positions of the adjacent parts of the apparatus while a buoyant member is passing through the compartment in the bottom of the tank, prior to entering the latter. In Fig. 12 the cams have opened communication between chambers C and D by closing valve plate 40 and then opening valve plate 25, thus shutting off the entrance of water from the tank and relieving the compartment of the pressure of the water column. This permits the water in both chambers to spill through pipe 22 in chamber D until the level of the top of said spill pipe is reached. The entire compartment is thus relieved of the pressure of the water column in the tank and air has been sucked in through pipe 48. The buoyancy of the floats 15 in the water outside and above the compartment is effective to move the reach of the belt upwardly causing the leading edge of the float just below the chamber to engage the lower gates 54 and separate them enough to allow this float to enter chamber C in the manner illustrated in Fig. 13. When the float is entirely within chamber C the cams close valve plate 25 to shut off communication between the chambers and then open valve plate 40 to admit water to the chamber C so that the float is thereafter influenced by the pressure of the water column in the tank and continues to rise towards the top of the chamber.

A certain quantity of air is trapped and compressed in the top of chamber C above the upper opening 39 and as the float rises to leave the chamber C, as shown in Fig. 14, this compressed air discharges through pipe 50 controlled by check-valve 51 that has been adjusted to the degree of pressure at which it is desired to release the air.

While this air is being released the water under the pressure of the column in the tank continues to flow into the chamber until the latter is filled and the floats has risen until its leading edge opens the gates 59 at the top of the chamber and passes into the water in the tank, and the gates 59 have been closed. At this stage the succeeding float is approaching entrance to the pressure relieving compartment as seen in Fig. 12 and the next cycle of operation starts by the closing of valve plate 40 and the opening of the valve plate 25 to again relieve the compartment of the pressure of the water column in the tank. The air under pressure that has been forced out of the top of chamber C though pipe 59 may be utilized in any manner desired.

What I claim is:—

1. A power generator comprising a tank having a column of water therein, an endless belt a portion of which passes vertically through said tank, floats arranged in spaced relation on said belt, the buoyancy of which floats cause the belt to travel, a walled chamber in the lower portion of said tank through which said floats are successively admitted to said tank, opposite walls of said chamber adapted to be alternately opened and closed to permit passage of said floats through said chamber, another of the walls of said chamber having a port providing communication between said tank and chamber, means for opening and closing said port whereby the hydraulic pressure of the water column is alternately effective within said chamber and the chamber is relieved of such pressure, and means for supplying water to said tank from an extraneous source in a quantity at least equal to the water discharged from said chamber during operation of the apparatus.

2. A power generator comprising a tank having a column of water therein, an endless belt a portion of which passes vertically through said tank, floats arranged in spaced relation on said belt, the buoyancy of which floats cause the belt to travel, a walled chamber in the lower portion of said tank through which said floats are successively admitted to said tank, opposite walls of said chamber adapted to be alternately opened and closed to permit passage of said floats through said chamber, another of the walls of said chamber having a port providing communication between said tank and chamber, means for closing said port to relieve said chamber of the hydraulic pressure of said water column during the entry of each float into the chamber, and means for supplying water to said tank from an extraneous source in a quantity at least equal to the water discharged from said chamber during operation of the apparatus.

3. A power generator comprising a tank having a column of water therein, an endless belt a portion of which passes vertically through said tank, floats arranged in spaced relation on said belt, the buoyancy of which floats cause the belt to travel, a walled chamber in the lower portion of said tank through which said floats are successively admitted to said tank, opposite walls of said chamber adapted to be alternately opened and closed to permit passage of said floats through said chamber, another of the walls of said chamber having a port providing communication between said tank and chamber, a second port in said chamber through which communication may be had to the outside of said tank, a member for opening and closing each port, devices for operating said members to close the first port and open the second port whereby to relieve the chamber of the hydraulic pressure of the water column during the entry of a float into said chamber, said means adapted to thereafter operate said members to restore the hydraulic pressure within said chamber during entrance of the float into the tank, and means for supplying water to said tank from an extraneous source in a quantity at least equal to the water discharged from said chamber during operation of the apparatus.

4. A power generator comprising a tank having a column of water therein, a belt a portion of one of the runs of which passes through said tank, buoyant members connected to said belt, communicating chambers below the level of said water column, a valve-controlled passage for admitting the liquid of the water column into one of said chambers to maintain a column of liquid under pressure therein, devices permitting entry of the belt and successive buoyant members into the last said chamber and the exit of said elements out of said chamber into said tank, the other chamber having a passage open to the atmosphere below the level of the column of liquid in the chamber through which the belt travels, means controlling communication between said chambers whereby to relieve hydraulic pressure during entry of a buoyant member into that chamber into which successive buoyant members enter, and means for supplying water to said tank from an extraneous source in a quantity at least equal to the water discharged from said chamber during operation of the apparatus.

5. A power generator comprising a tank having a water column therein, a belt a portion of one of the runs of which passes through said tank, buoyant members connected to said belt, a relief chamber in the lower portion of said tank through which said belt and buoyant members pass into said tank, a discharge chamber having communication with said relief chamber, a valve-controlled passage for admitting the liquid of the water column to said relief chamber to maintain a column of liquid under pressure therein, devices permitting entry and exit of each buoyant member into and out of said relief chamber and into said tank, the discharge chamber having a passage open to the atmosphere below the level of the column of liquid in the relief chamber, means for controlling communication between said chambers during entry of each buoyant member into said relief chamber whereby to reduce the hydraulic pressure in said relief chamber during the entrance period of each buoyant member, and means for supplying water to said tank from an extraneous source in a quantity at least equal to the water discharged from said chamber during operation of the apparatus.

6. A power generator comprising a tank having a column of water therein, pulleys at the top and bottom of said tank, an endless belt passing around said pulleys and having one of its runs movable up through said tank water column, buoyant members connected to said belt and automatically operated upon in said water column to cause said belt to travel, communicating relief and discharge chambers in the bottom of said tank, a valve-controlled passage for admitting liquid from said water column to said relief chamber to maintain a column of liquid under pressure in said chamber, devices permitting entry of successive buoyant members into said relief chamber and their exit therefrom into the tank, the discharge chamber having a passage open to the atmosphere below the level of the liquid column in the relief chamber, means controlling the communication between said chambers whereby to reduce the hydraulic pressure in the relief chamber during entry of each buoyant member therein, and means for supplying water to said tank from an extraneous source in a quantity at least equal to the water discharged from said chamber during operation of the apparatus.

ALFRED G. GRONDAHL.